(12) United States Patent
Atmur

(10) Patent No.: US 6,642,683 B1
(45) Date of Patent: Nov. 4, 2003

(54) CONTROLLER AND ASSOCIATED DRIVE ASSEMBLY FOR POWER SHARING, TIME SLICED CONTROL OF A BRUSHLESS DIRECT CURRENT MOTOR

(75) Inventor: Robert J. Atmur, Whittier, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/227,774

(22) Filed: Aug. 26, 2002

(51) Int. Cl.[7] ................ H02P 1/00; H02P 5/40
(52) U.S. Cl. ............ 318/439; 318/254; 318/138
(58) Field of Search .............. 318/254, 560, 318/379, 138, 439, 720, 721, 722, 723, 724; 388/902; 363/40, 98

(56) References Cited

U.S. PATENT DOCUMENTS

| | | | | |
|---|---|---|---|---|
| 5,675,231 A | * | 10/1997 | Becerra et al. | 318/254 |
| 5,917,295 A | * | 6/1999 | Mongeau | 318/254 |
| 6,034,494 A | * | 3/2000 | Kitamine et al. | 318/254 |
| 6,215,261 B1 | * | 4/2001 | Becerra | 318/254 |
| 6,236,179 B1 | * | 5/2001 | Lawler et al. | 318/254 |
| 6,320,731 B1 | | 11/2001 | Eaves et al. | |
| 6,362,592 B1 | | 3/2002 | Chrappan Soldavini | |
| 6,400,107 B1 | * | 6/2002 | Nakatani et al. | 318/254 |
| 6,424,798 B1 | * | 7/2002 | Kitamine | 318/254 |

FOREIGN PATENT DOCUMENTS

| | | | | |
|---|---|---|---|---|
| JP | 02168892 A | * | 6/1990 | H02P/7/00 |
| WO | WO 8300851 A1 | * | 3/1983 | B63H/21/12 |

OTHER PUBLICATIONS

Nikolaus P. Schibli; Tung Nguyen; Alfred C. Rufer; *A Three–Phase Multilevel Converter for High–Power Induction Motors*; IEEE Transactions on Power Electronics; Sep. 1998; pp. 978–986; vol. 13, No. 5; IEEE.

M.S. Kennedy Corp.; *28 AMP, 500 Volt IGBT Plus Diode Smart Power 3–Phase Motor Drive Power Hybrid—4357*; 6 pages; available at <http://www.mskennedy.com>; Preliminary Rev. E Nov. 2001.

* cited by examiner

*Primary Examiner*—Robert E. Nappi
*Assistant Examiner*—Eduardo Colon-Santana
(74) *Attorney, Agent, or Firm*—Alston & Bird LLP

(57) ABSTRACT

A controller for controlling a BLDC motor controller includes a drive assembly, and a processing element. The processing element is in electrical communication with the drive assembly and the BLDC motor, and the processing element is capable of controlling operation of the drive assembly. The drive assembly, is in electrical communication with a power supply and the BLDC motor. The drive assembly includes a plurality of half-bridge assemblies that each include two switching elements. In this regard, at least two half-bridge assemblies are electrically connected to each phase winding of the BLDC motor. Thus, each switching element is capable of operating at an operating frequency with a first duty ratio such that the half-bridge assemblies are capable of providing the pulse-width-modulated input voltage to the respective phase winding of the BLDC motor at the operating frequency at a second duty ratio higher than the first duty ratio.

14 Claims, 8 Drawing Sheets

COMMAND SIGNALS TO SINGLE HALF-BRIDGE ASSEMBLY TO ONE PHASE WINDING

OUTPUT OF SINGLE HALF-BRIDGE ASSEMBLY TO ONE PHASE WINDING

EFFECTIVE OUTPUT OF SINGLE HALF-BRIDGE ASSEMBLY TO ONE PHASE WINDING

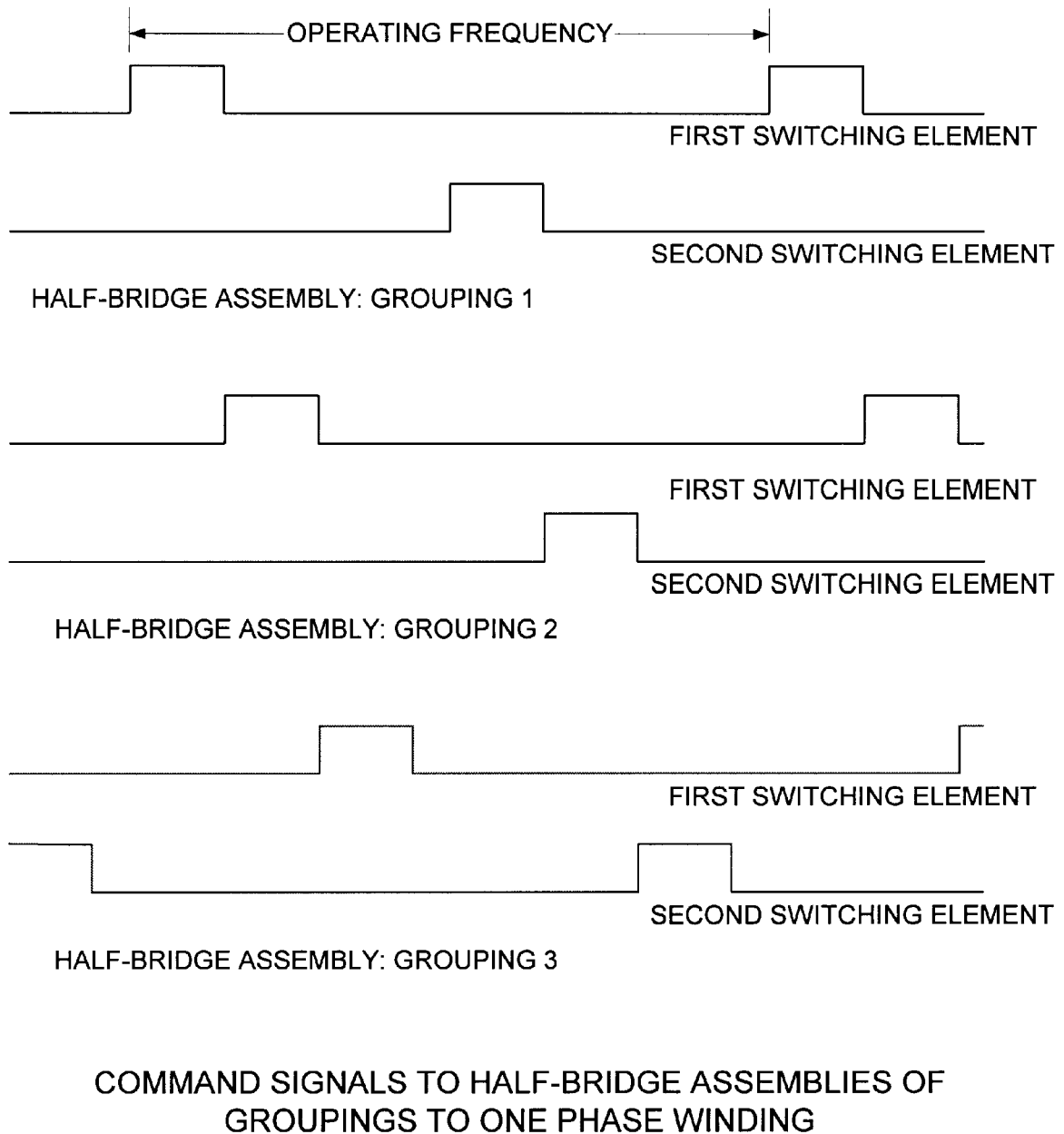

HALF-BRIDGE ASSEMBLY: GROUPING 1

HALF-BRIDGE ASSEMBLY: GROUPING 2

HALF-BRIDGE ASSEMBLY: GROUPING 3

OUTPUTS OF HALF-BRIDGE ASSEMBLIES OF GROUPINGS TO ONE PHASE WINDING

EFFECTIVE OUTPUT OF HALF-BRIDGE ASSEMBLIES TO ONE PHASE WINDING (i.e., HALF-BRIDGE ASSEMBLIES 1 THROUGH 3)

CONTROLLER AND ASSOCIATED DRIVE ASSEMBLY FOR POWER SHARING, TIME SLICED CONTROL OF A BRUSHLESS DIRECT CURRENT MOTOR

FIELD OF THE INVENTION

The present invention relates generally to systems and methods for controlling an electric motor and, more particularly, to a controller and associated drive assembly for controlling a brushless direct current (BLDC) motor capable of power sharing, time sliced operation.

BACKGROUND OF THE INVENTION

Electrical machines are used throughout a great number of devices today, and typically consist of motors, which convert electrical energy into mechanical energy, and generators, which convert mechanical energy into electrical energy. Generally, electrical machines fall into one of three categories: polyphase synchronous machines, polyphase asynchronous (i.e., induction) machines and direct current (DC) machines. Typical machines consist of two main portions: a stationary, outside portion called a stator, and a rotating, inner portion called a rotor. The rotor of typical machines is mounted on a stiff rod, or shaft, that is supported in bearings so that the rotor is free to turn within the stator to produce mechanical energy.

In one type of synchronous machine, a permanent magnet, brushless direct current (BLDC) machine, the stator is composed of windings that are connected to a controller, and the rotor is composed of two or more permanent magnets of opposed magnetic polarity. The controller includes a driver that generates poly-phase alternating input currents to the stator windings. One conventional driver includes a series of Insulated Gate Bipolar Transistors (IGBT's) electrically connected to the phase windings of a BLDC motor. For example, for-a three-phase BLDC motor, a conventional driver includes six IGBT's arranged in three half-bridges, where each half-bridge generates a drive for one phase of the motor.

As the rotor rotates within the stator, and the magnets of one polarity approach cores of the stator about which the windings are wound, and that conduct the opposed polarity, sensors signal the angular position of the rotor to the controller which, in turn, controls the alternating currents to switch the polarity of the magnetic field produced by windings of the stator. For example, a three-phase BLDC motor can have two, four or more permanent magnets with alternating magnetic polarities mounted on its rotor. The required rotating magnetic field is produced by current through the stator windings. And the three phases of the current are switched in sequence, which is dictated by the angular position of the rotor.

In many BLDC motor systems, the speed of the BLDC motor is controlled by the driver pulse modulating, such as pulse width modulating, the input voltage generated by the controller. By pulse-width-modulation (PWM) of the input voltage, the driver and, thus, the controller controls the average input currents to the windings by using "on" and "off" states. During the time the input currents through the windings are increasing, the voltage supply provides constant voltage to the driver at a level at least as high as the motor voltage required for the desired speed of operation. Once the currents have reached the required levels for the desired speed of the motor, the duty ratio is changed to that required to maintain the currents at or near the required level of current.

Conventional BLDC motor systems that include a driver comprising a series of IGBT's are adequate in controlling the speed of BLDC motors at low frequencies and currents. A standard driver including six IGBT's can drive a three-phase motor (two IGBT's per phase) with a switching frequency up to approximately 20 kHz if the maximum current of approximately 50 Amps is not required for more than a few minutes. In this regard, each IGBT can typically operate with a maximum switching frequency of approximately 20 kHz at a maximum of 50 Amps. Whereas such drivers can control the speed of BLDC motors at low frequencies, such drivers that drive higher power (e.g., greater than one horsepower) and higher voltage (e.g., greater than 200 volts) three-phase motors cannot typically switch at a frequency higher than 20 kHz when the driver comprises IGBT's. The limit in switching frequency is due to the losses associated with switching the IGBT's and the average current being switched. What makes the IGBT poor at higher frequencies is that the gate of the transistor is not directly connected to the gate drive circuit (hence insulated gate) and, thus, the electrical charge cannot be quickly removed. The rate at which the electrical charge can be applied or removed fixes the time the IGBT is transitioning between its "off" and saturated "on" states. As the switching frequency increases, the percentage of time that the IGBT is in these transitional regions increases. Also, as current is flowing while the IGBT transitions between states, the power dissipated while the IGBT is in these transitional regions increases. And while other, more advanced products are available that can run at higher frequencies, such products are factors of 50 times more expensive than conventional IGBT's and are not production items.

SUMMARY OF THE INVENTION

In light of the foregoing, various embodiments of the present invention provide an improved controller and associated drive assembly for power sharing, time sliced control of a brushless direct current (BLDC) motor, where the motor includes a predetermined number of phase windings. Various embodiments of the controller and associated drive assembly of the present invention include a plurality of switching elements, such as IGBT's, arranged such that the power dissipation of each switching element is reduced, as compared to the switching elements of a conventional driver. In this regard, the switching elements can be operated at a desired frequency with a duty cycle less than the duty cycle of the operating frequency at which the switching elements of the drive assembly collectively drive the BLDC motor. Further, even though the drive assembly of embodiments of the present invention provide for more switching elements than the conventional driver, the number of transitions of the switching elements does not increase. Thus, operation of the drive assembly of the present invention does not reduce the efficiency of the switching elements, as compared to a conventional drive assembly.

According to one embodiment, a controller for controlling a BLDC motor controller includes a drive assembly, and a processing element. The processing element is in electrical communication with the drive assembly and the BLDC motor, and the processing element is capable of controlling operation of the drive assembly. The drive assembly, on the other hand, is in electrical communication with a power supply and the BLDC motor. As such, the drive assembly is capable of receiving a voltage output of the power supply and is capable of providing a pulse-width-modulated input voltage to the BLDC motor.

The drive assembly includes a plurality of half-bridge assemblies that each include two switching elements, such as insulated gate bipolar transistors (IGBT's). In this regard, at least two half-bridge assemblies are electrically connected to each phase winding of the BLDC motor. And each switching element is capable of operating at an operating frequency with a first duty ratio such that the half-bridge assemblies are capable of providing the pulse-width-modulated input voltage to the respective phase winding of the BLDC motor at the operating frequency with a second duty ratio higher than the first duty ratio. More particularly, the half-bridge assemblies that are electrically connected to each phase winding of the BLDC motor are capable of providing the pulse-width-modulated input voltage to the respective phase winding of the BLDC motor at the operating frequency with a second duty ratio equal to the product of the number of half-bridge assemblies electrically connected to the respective phase winding and the first duty ratio.

According to another embodiment, the drive assembly comprises a plurality of drive elements that each include the predefined number of half-bridge assemblies. In this embodiment, each half-bridge assembly of each drive element is electrically connected to a respective phase winding of the BLDC motor. For example, the BLDC motor can include a first, a second and a third phase winding, where the drive assembly comprises a plurality of drive elements that each comprise a first half-bridge assembly, a second half-bridge assembly and a third half-bridge assembly. In this regard, the first half-bridge assemblies can be electrically connected to the first phase winding, the second half-bridge assemblies can be electrically connected to the second phase winding, and the third half-bridge assemblies can be electrically connected to the third phase winding.

According to yet another embodiment where the drive assembly comprises a predefined number of drive elements that each comprise a plurality of half-bridge assemblies, each half-bridge assembly of the drive elements is electrically connected to a respective phase winding of the BLDC motor. For example, the BLDC motor can include the first, second and third phase winding. In this regard, the drive assembly can comprise a first, a second and a third drive element that each comprise a plurality of half-bridge assemblies. Thus, the half-bridge assemblies of the first drive element can be electrically connected to the first phase winding, the half-bridge assemblies of the second drive element can be electrically connected to the second phase winding, and the half-bridge assemblies of the third drive element can be electrically connected to the third phase winding.

BRIEF DESCRIPTION OF THE DRAWINGS

Figure 1:
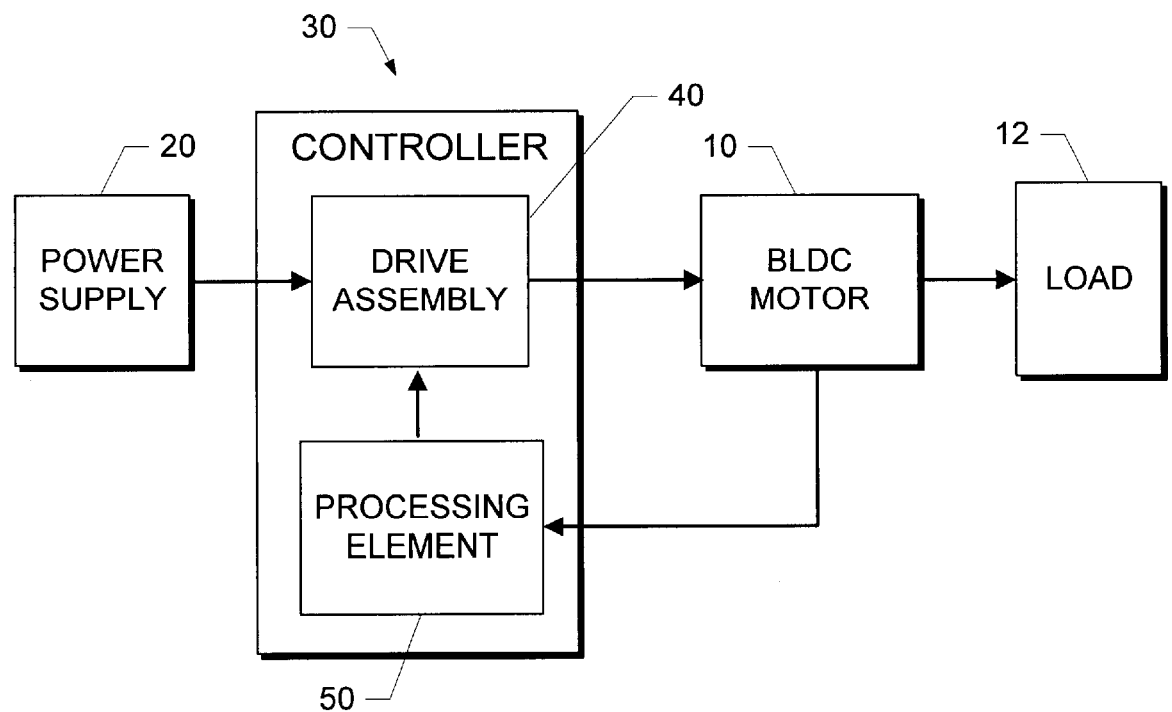
Figure 2:
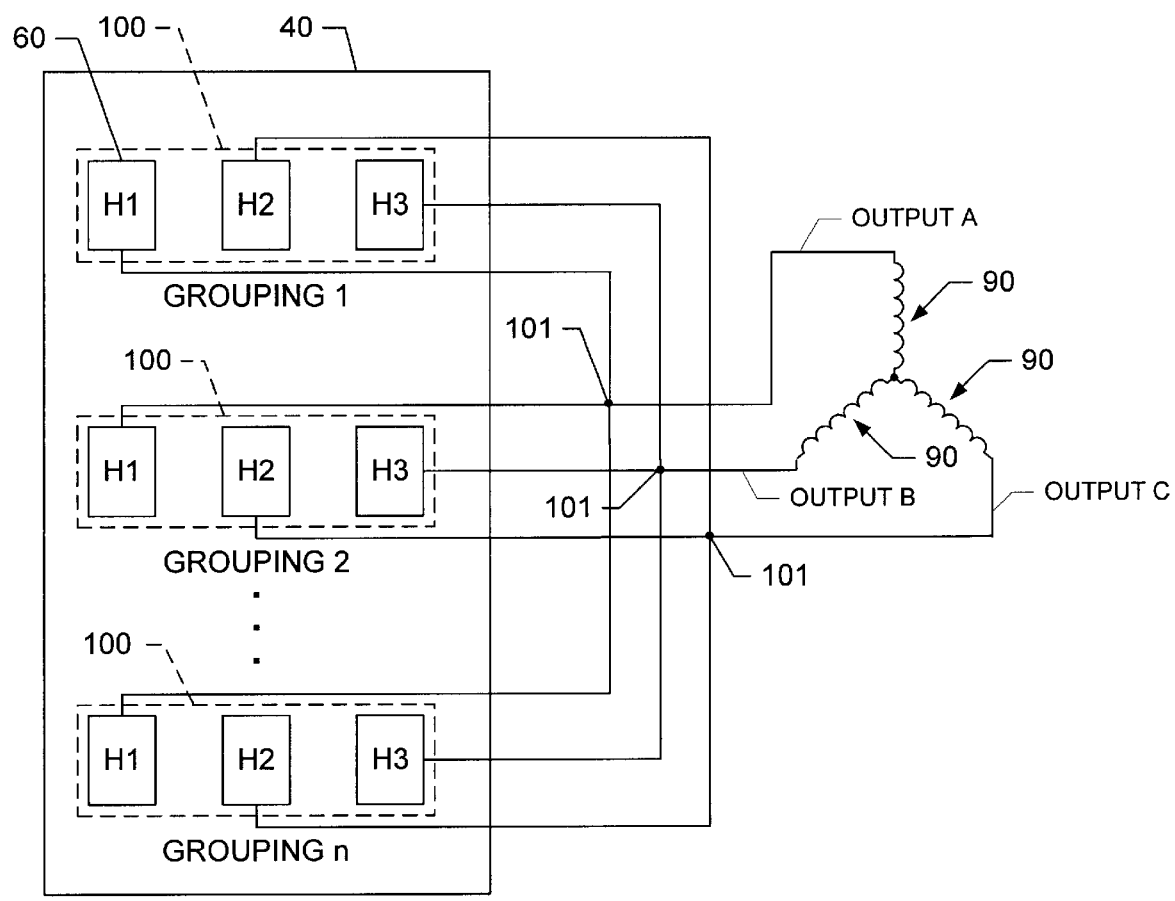
Figure 3:
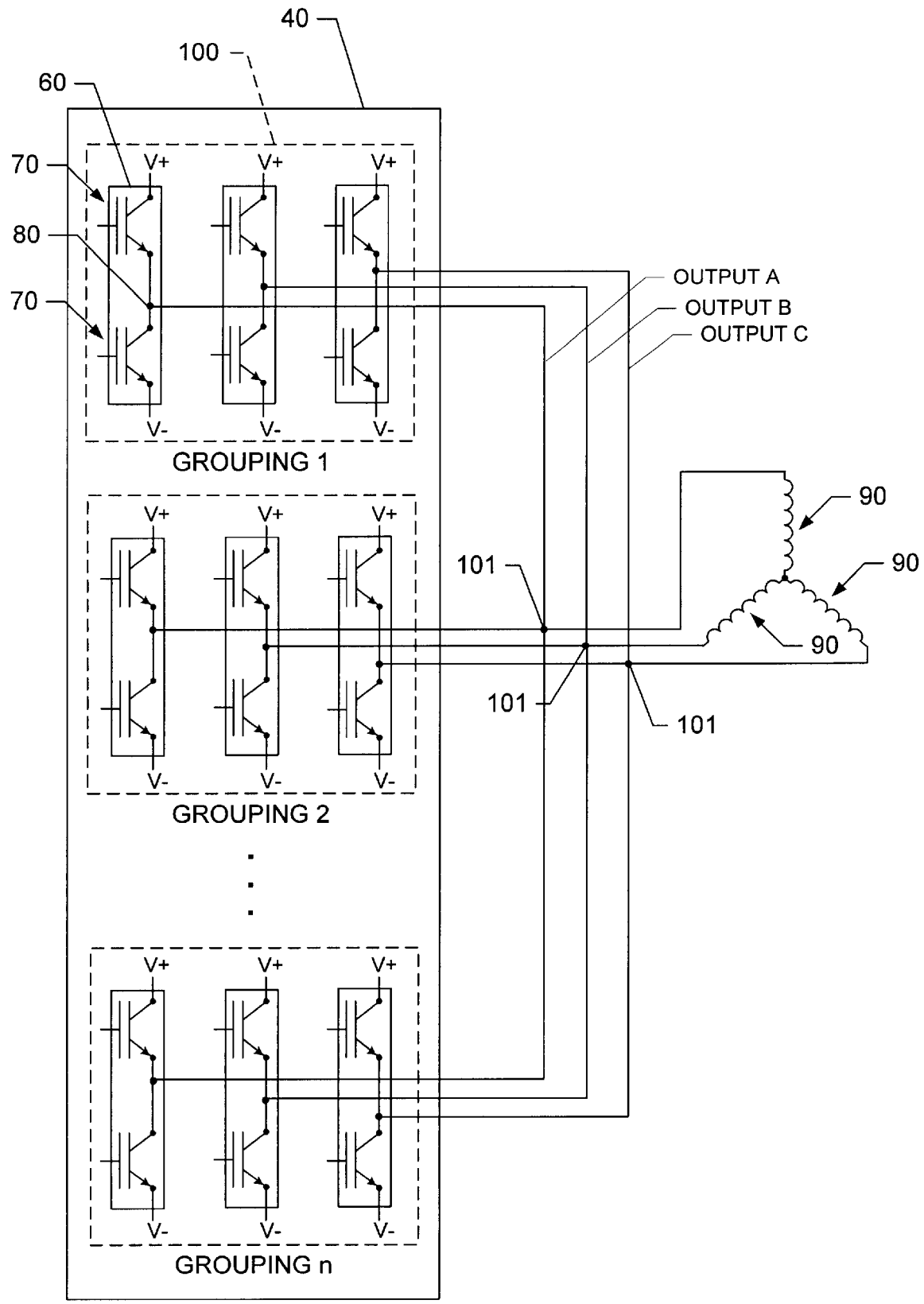
Figure 4A:
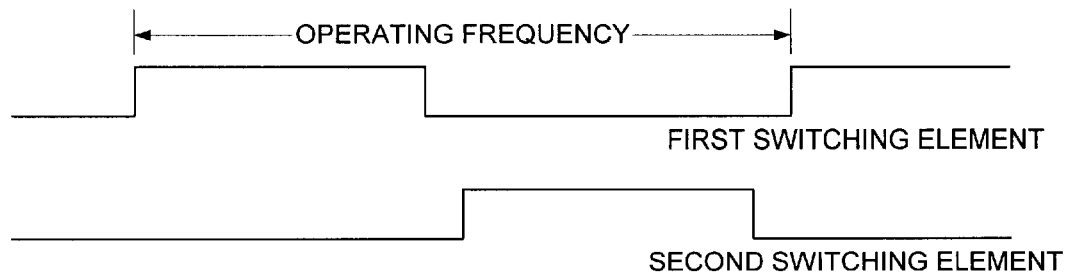
Figure 4B:
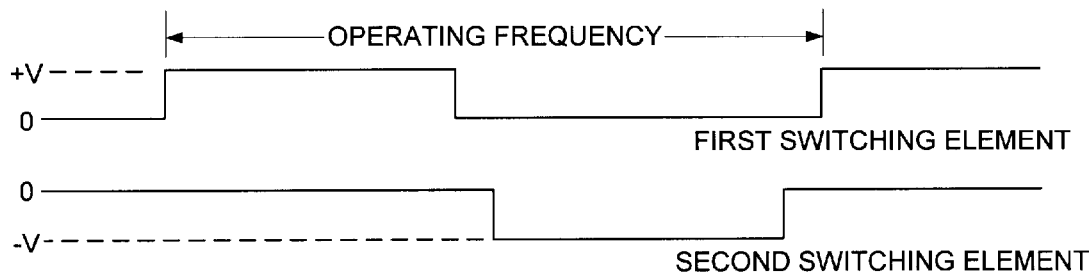
Figure 4C:
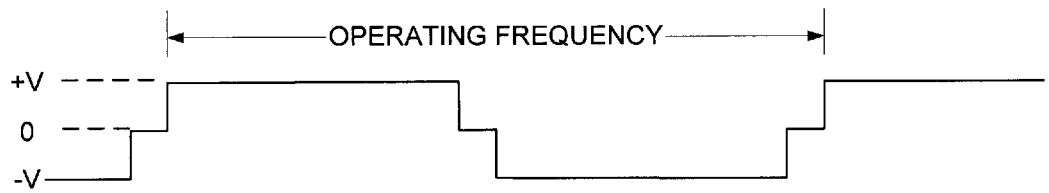
Figure 5B:
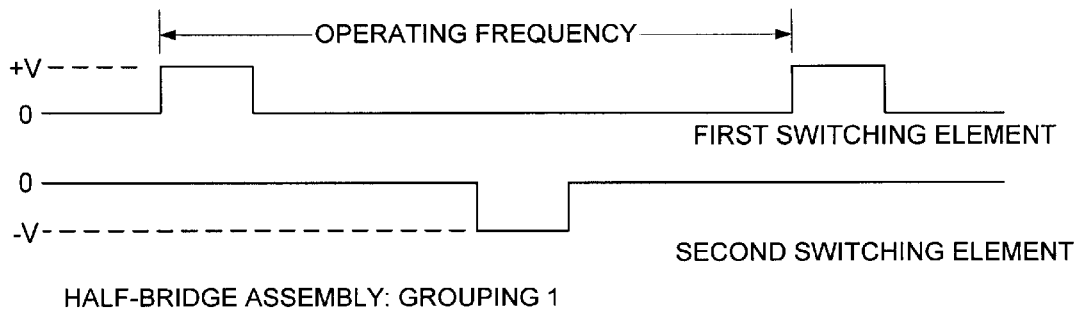
Figure 5B:
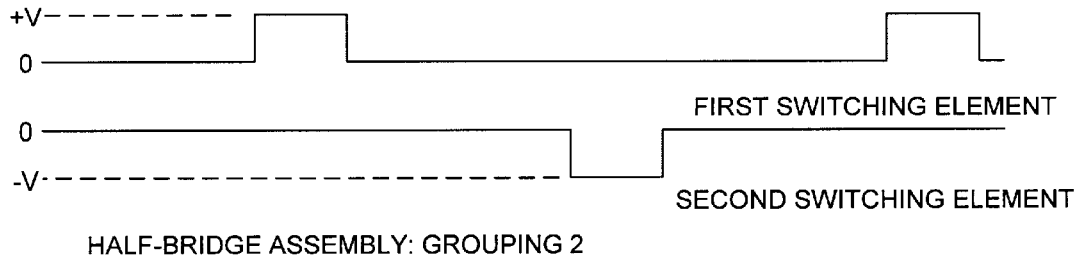
Figure 5B:
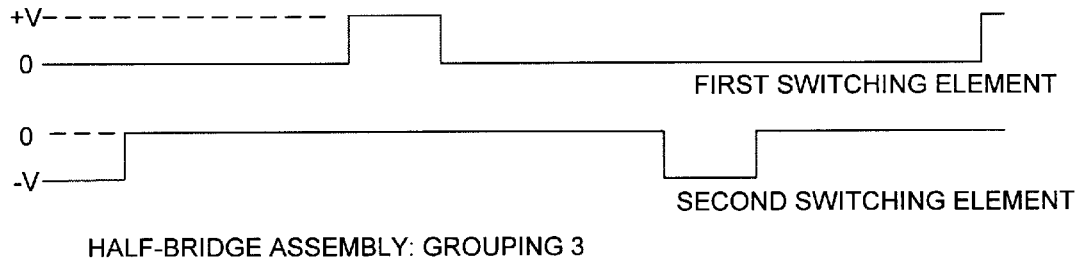
Figure 5C:
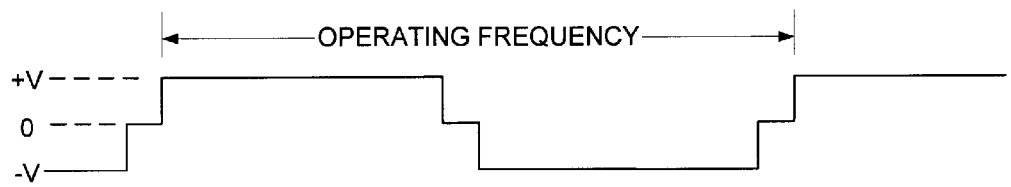
Figure 6:
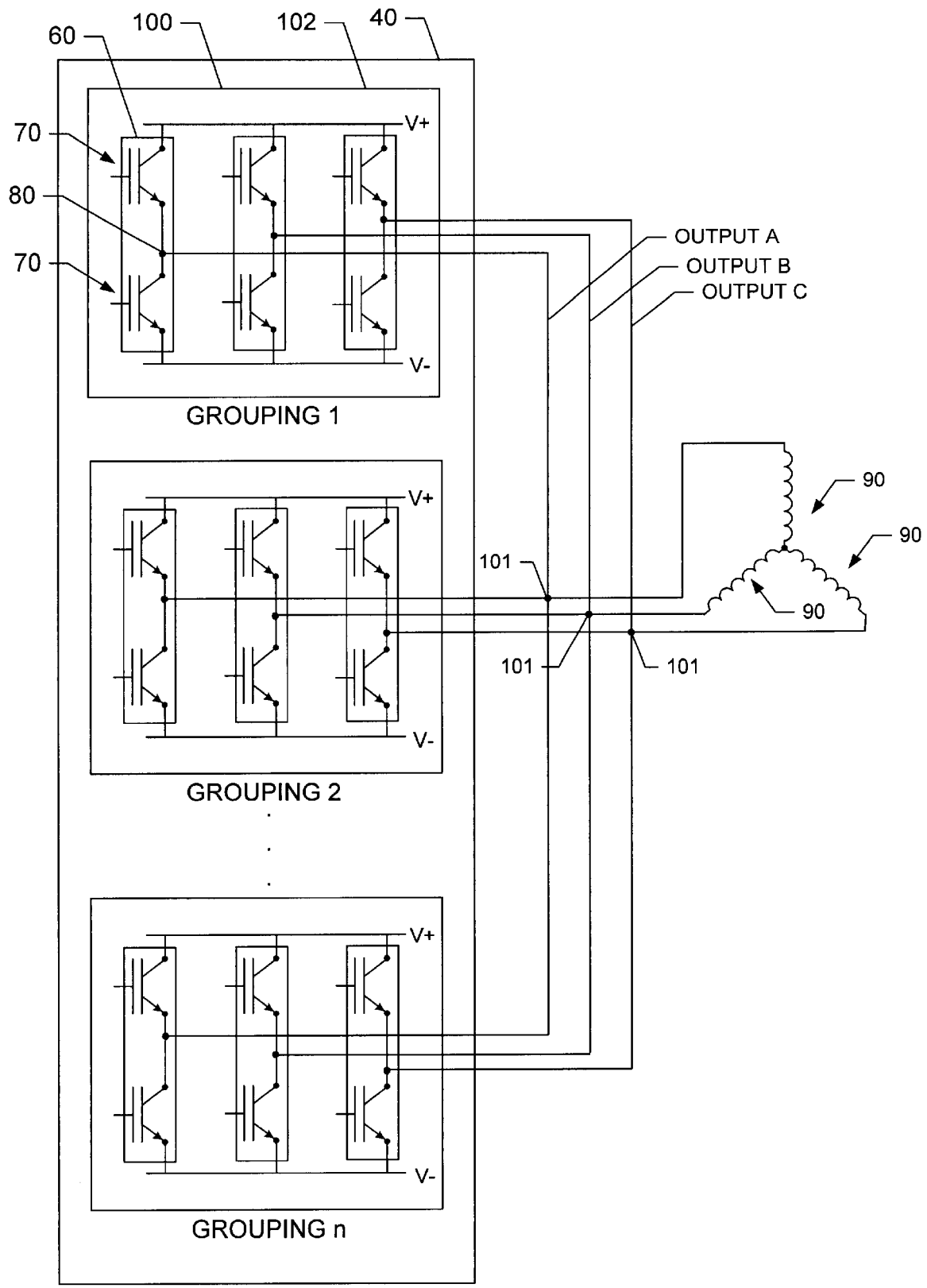
Figure 7:
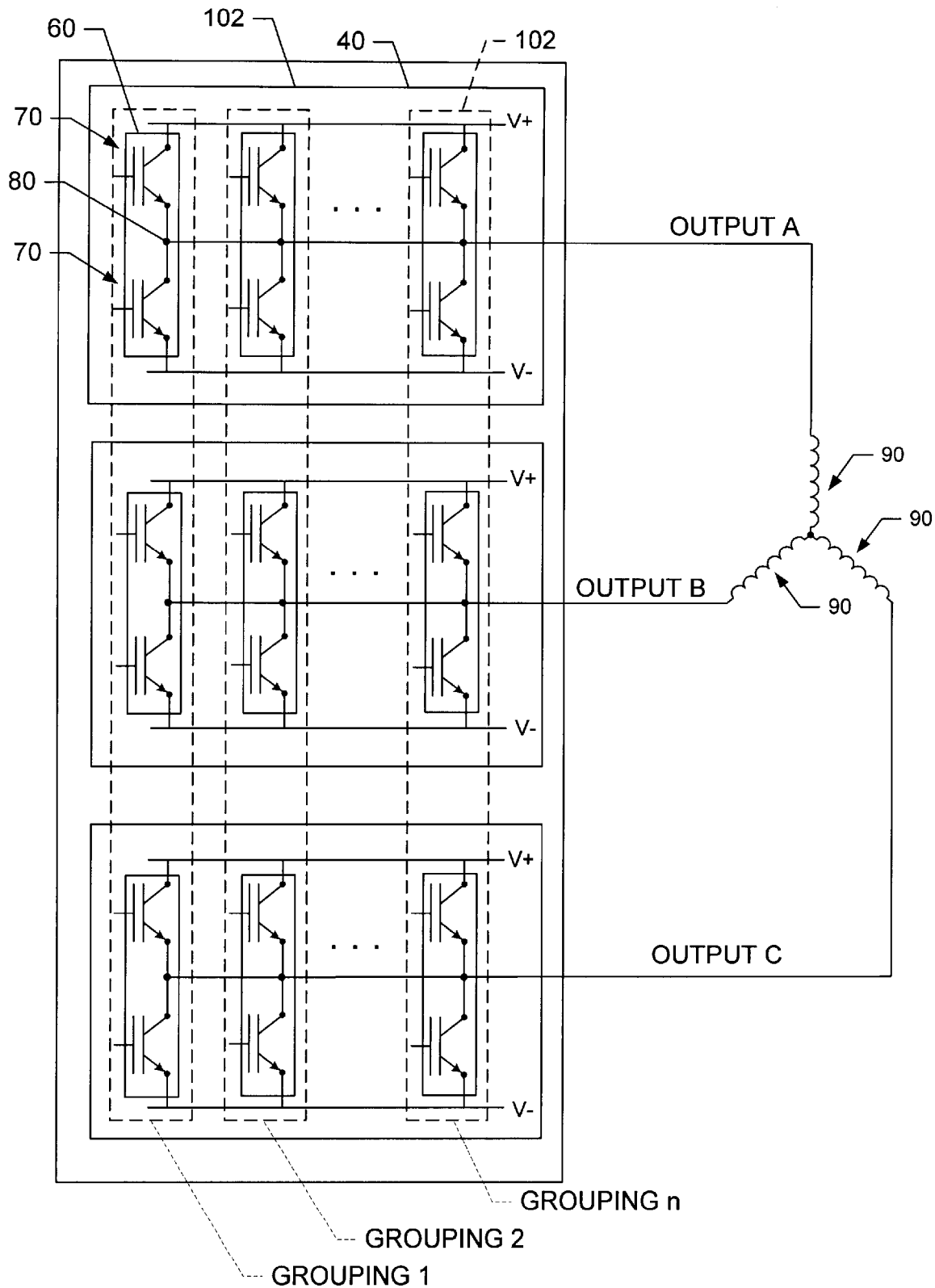

Having thus described the invention in general terms, reference will now be made to the accompanying drawings, which are not necessarily drawn to scale, and wherein:

FIG. 1 is a block diagram of a system for controlling a brushless direct current (BLDC) motor according to one embodiment of the present invention;

FIG. 2 is a schematic diagram of the drive assembly and BLDC motor according to one embodiment of the present invention;

FIG. 3 is a schematic diagram of the drive assembly and BLDC motor further highlighting the switching elements of the half-bridge assemblies according to one embodiment of the present invention;

FIG. 4A is a timing diagram of command signals to each switching element individually, FIG. 4B is a timing diagram of the outputs of the switching elements individually, and FIG. 4C is a timing diagram of effective output of the switching elements collectively, where a single half-bridge assembly is electrically connected to a respective phase winding of the BLDC motor;

FIG. 5A is timing diagram of command signals to each switching element individually, FIG. 5B is a timing diagram of the outputs of the switching elements individually, and FIG. 5C is a timing diagram of effective output of the switching elements collectively, where a plurality of half-bridge assemblies are electrically connected to a respective phase winding of the BLDC motor, according to one embodiment of the present invention;

FIG. 6 is a schematic diagram of one arrangement of the drive assembly and BLDC motor, where the drive assembly includes drive elements, according to one embodiment of the present invention; and FIG. 7 is a schematic diagram of another arrangement of the drive assembly and BLDC motor, where the drive assembly includes drive elements, according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system is provided for controlling a BLDC motor 10. As described below, the BLDC motor is a three-phase BLDC motor including three phase windings, but it should be understood that the motor can comprise a BLDC motor including any of a number of different phases and, thus, phase windings, without departing from the spirit and scope of the present invention. According to one embodiment, the system includes a power supply 20 and a controller 30. And, as illustrated, the BLDC motor is preferably connected to a load 12, to which the mechanical energy generated by the motor is transferred.

The power supply 20 is typically a direct current (DC) power supply, however, it should be understood that the power supply can alternatively be an alternating current (AC) power supply with an additional voltage converter included within the system, as described below. The controller 30 is in electrical communication with the power supply and the BLDC motor 10, and includes a drive assembly 40 and a processing element 50. The processing element of the controller, such as a personal computer or other high level processor, is in electrical communication with the drive assembly and the power supply. In this regard, the processing element performs conventional motion control system controller functions, as such are known, including controlling operation of the drive assembly.

The drive assembly 40 is in electrical communication with the power supply 20 and the motor 10. The drive assembly generally receives the voltage output from the power supply and provides a pulse-width modulated (PWM) input voltage to the motor in accordance with a predetermined relationship between the average current output and the PWM input voltage, as such is known. To provide proper PWM input to the motor, the processing element 50 typically receives commutation feedback from the motor consisting of rotor magnetic field orientation information obtained from such devices as magnetic field sensors (e.g., Hall Effect Sensors) or position sensors (e.g., encoders or resolvers).

As shown more distinctly in FIGS. 2 and 3, the drive assembly 40 comprises a plurality of half-bridge assemblies 60, where each half-bridge assembly includes two switching elements 70, such as insulated gate bipolar transistors (IGBT's) connected in series with a node 80 between the switching elements. The collector and emitter of each IGBT are electrically connected to the power supply 20 and, although not illustrated, the gate of each IGBT is connected to the processing element 50. It will be appreciated that, although not illustrated, each half-bridge assembly can further include any one of a number of other electrical components, as such are known. For example, each switching element of each half-bridge assembly can be electrically connected to a fast recovery epitaxial diode (FRED).

As shown, the half-bridge assemblies 60 are arranged in groupings 100 (each designated grouping 1 through grouping n) that are electrically connected to each phase winding 90 of the BLDC motor 10. In this regard, each half-bridge assembly in a grouping can be electrically connected to a respective output node 101 that is electrically connected to a different phase winding of the BLDC motor. Each grouping thus contains the same number of half-bridge assemblies as the number of phase windings of the BLDC motor. Thus, as shown, for a three-phase motor, each grouping includes three half-bridge assemblies (designated H1, H2 and H3). As such, each grouping of half-bridge assemblies is capable of providing a PWM output (illustrated as outputs A, B and C) to the phase windings of the BLDC motor.

Each switching element 70 can operate at an operating frequency that does not exceed a predetermined maximum switching frequency, which is typically based on a maximum allowable power dissipation. For example, when the switching elements comprise IGBT's, each switching element typically cannot operate at a frequency exceeding approximately 20 kHz. In this regard, assume that only one such half-bridge assembly 60 is connected to each output node 101 such that only one such half-bridge assembly is electrically connected to each phase winding 70 of the BLDC motor 10. By including only one such half-bridge assembly per phase winding 90, which is typical in a conventional BLDC driver, a driver that includes three half-bridge assemblies can drive a three-phase BLDC motor at a maximum frequency of 20 kHz.

FIG. 4A illustrates a timing diagram of command signals to each switching element 70 of a single half-bridge assembly 60 connected to a respective phase winding 90 of a three-phase BLDC motor 10 operating at the maximum frequency of the switching elements. And FIG. 4B illustrates a timing diagram of the outputs of the respective switching elements. As illustrated, the first and second switching elements are operated in the "on" and "off" states during the same frequency period, with the second switching element switched in a staggered manner with respect to the first switching element, as is known. Thus, as shown in FIG. 4C, then, each half-bridge assembly is capable of providing a PWM output to one phase winding of the BLDC motor at a desired operating frequency, such as 18 kHz. For example, presuming the switching elements comprise IGBT's operating at approximately 18 kHz, the single half-bridge assembly is capable of providing a PWM output to one phase winding at an effective frequency also at approximately 18 kHz. As is known, however, operating switching elements such as IGBT's at higher frequencies can cause an undesirably high level of power dissipation from each IGBT.

Thus, according to the present invention, by electrically connecting each grouping 100 of half-bridge assemblies 60 to the phase windings 90 of the BLDC motor 10 such that each half-bridge assembly of a grouping is connected to a different phase winding, the overall current required to drive the phase winding can be divided among each half-bride assembly. As such, the power dissipation in each half-bridge assembly is reduced as compared to driving the phase winding with one half-bridge assembly, as shown in FIGS. 4A–4C.

Reference is now drawn to FIGS. 5A and 5B, which illustrates timing diagrams of the command signals to the switching elements and the outputs of the switching elements, respectively, of three groupings (i.e., n=3) of half-bridge assemblies. In turn, the three half-bridge assemblies are connected to a respective output node 101 (e.g., all H1's to a first node, all H2's to a second node, or H3's to a third node) to thereby provide a PWM output (e.g., output A, B or C) to a respective phase winding of a three-phase BLDC motor. As compared to the timing diagrams of FIGS. 4A and 4B, the first and second switching elements of each half-bridge assembly can be operated in the "on" and "off" states for one third of the respective frequency period of the switching elements. As such, to operate a single half-bridge assembly at a desired operating frequency, each switching element of the half-bridge assembly is operated at the operating frequency with a duty ratio, such as approximately 50% (as shown in FIGS. 4A and 4B). But to operate the switching elements of the groupings to drive the phase windings at the same operating frequency with the same duty ratio (i.e., second duty ratio) (compare FIGS. 4C and 5C), each switching element need only be operated at the operating frequency with a first duty ratio equal to the second duty ratio divided by the number of groupings n (as shown in FIGS. 5A and 5B). In other terms, the switching elements of the groupings are capable of operating at the operating frequency with a first duty ratio to thereby provide a PWM voltage to the phase windings at the operating frequency with a second duty ratio equal to the product of the first duty ratio and n.

As shown in FIG. 5C, then, the half-bridge assemblies 60 of the groupings 100 electrically connected to a respective phase winding 90 are capable of providing a PWM output to the respective phase winding at the same frequency as that provided by a single half-bridge assembly, while reducing the amount of current driving each switching element 70 at the maximum frequency. As such, it will be appreciated that by reducing the amount of current driving each switching element, the power dissipation of each switching element is reduced. Further, comparing FIGS. 4C and 5C, it will also be appreciated that even though the present invention provides for more switching elements than a conventional drive assembly, the number of transitions of the switching elements does not increase, thus, operation of the drive assembly of the present invention does not reduce the efficiency of the switching elements, as compared to a conventional drive assembly.

At this point it will be noted that as the half-bridge assemblies 60 of each grouping 100 are electrically connected to an output node to thereby be electrically connected to a respective phase winding 90 of the BLDC motor 10, the half-bridge assemblies of the overall driver assembly 40 can be located relative to one another in any one of a number of different manners. In this regard, attention is now drawn to FIGS. 6 and 7 which illustrate embodiments of the present invention where pluralities of half-bridge assemblies are embodied within a number of drive elements 102. The drive elements can comprise any of a number of different devices including any number of half-bridge assemblies. For example, the drive element can comprise a model 4357 3-phase motor drive including three half-bridge assemblies, which is manufactured by M.S. Kennedy Corp. of Liverpool, N.Y.

As shown in FIG. 6, the drive assembly 40 includes n groupings of half-bridge assemblies 60, where each grouping is embodied in a separate drive element 102. Thus, the embodiment of FIG. 6 includes n drive elements. For example, where the BLDC motor 10 comprises a three-phase motor and the drive assembly includes three groupings of half-bridge assemblies, the BLDC motor can be considered to have a first, a second and a third phase winding. Similarly, each drive element can be considered to include a first half-bridge assembly, a second half-bridge assembly and a third half-bridge assembly. Thus, from the arrangement illustrated in FIG. 6, the first half-bridge assemblies could be electrically connected to the first phase winding, the second half-bridge assemblies could be electrically connected to the second phase winding, and the third half-bridge assemblies could be electrically connected to the third phase winding.

FIG. 7 illustrates an alternative embodiment where each drive element 102 includes n half-bridge assemblies 60 where each half-bridge assembly belongs to a different grouping 102. In this regard, the number of drive elements equals the number of phase windings 90 of the BLDC motor. Thus, for example, consider the BLDC motor that includes the first, second and third phase windings. Also, consider a drive assembly 40 including a first, a second and a third drive element that each comprise n half-bridge assemblies. According to the arrangement illustrated in FIG. 7, then, the half-bridge assemblies of the first drive element could be electrically connected to the first phase winding, the half-bridge assemblies of the second drive element could be electrically connected to the second phase winding, and the half-bridge assemblies of the third drive element could be electrically connected to the third phase winding.

It should be noted that FIGS. 6 and 7 are merely illustrative of various methods of arranging the half-bridge assemblies according to various embodiments of the present invention. In this regard, the half-bridge assemblies can be physically located in any one of a number of different manners with respect to one another without departing from the spirit and scope of the present invention. It will be appreciated, however, that in embodiments where the drive elements include the half-bridge assemblies for respective groupings (FIG. 6), the drive assembly can continue to operate to drive the BLDC motor in the event of failure of one or more of the drive elements. In this regard, as long as one of the drive elements continues to operate, the drive assembly is capable of continuing to drive the motor.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A controller for controlling a brushless direct current (BLDC) motor, wherein the BLDC motor includes a predetermined number of phase windings, said controller comprising:

a drive assembly in electrical communication with a power supply and the BLDC motor, wherein said drive assembly is capable of receiving a voltage output of the power supply and is capable of providing a pulse-width-modulated input voltage to the BLDC motor, wherein said drive assembly comprises a plurality of half-bridge assemblies that each include two switching elements, wherein at least two half-bridge assemblies are electrically connected to each phase winding of the BLDC motor, and wherein each switching element is capable of operating at an operating frequency with a first duty ratio such that the at least two half-bridge assemblies are capable of providing the pulse-width-modulated input voltage to the respective phase winding of the BLDC motor at the operating frequency with a second duty ratio higher than the first duty ratio; and a processing element in electrical communication with said drive assembly and the BLDC motor wherein said processing element is capable of controlling operation of the drive assembly.

2. A controller according to claim 1, wherein the switching elements comprise insulated gate bipolar transistors (IGBT's).

3. A controller according to claim 1, wherein said drive assembly comprises a plurality of drive elements that each comprise the predefined number of half-bridge assemblies, wherein each half-bridge assembly of each drive element is electrically connected to a respective phase winding of the BLDC motor.

4. A controller according to claim 3, wherein the BLDC motor includes a first, a second and a third phase winding, wherein said drive assembly comprises a plurality of drive elements that each comprise a first half-bridge assembly, a second half-bridge assembly and a third half-bridge assembly, wherein the first half-bridge assemblies are electrically connected to the first phase winding, wherein the second half-bridge assemblies are electrically connected to the second phase winding, and wherein the third half-bridge assemblies are electrically connected to the third phase winding.

5. A controller according to claim 1, wherein said drive assembly comprises a predefined number of drive elements that each comprise a plurality of half-bridge assemblies, wherein each half-bridge assembly of the drive elements is electrically connected to a respective phase winding of the BLDC motor.

6. A controller according to claim 5, wherein the BLDC motor includes a first, a second and a third phase winding, wherein said drive assembly comprises a first, a second and a third drive element that each comprise a plurality of half-bridge assemblies, wherein the half-bridge assemblies of the first drive element are electrically connected to the first phase winding, wherein the half-bridge assemblies of the second drive element are electrically connected to the second phase winding, and wherein the half-bridge assemblies of the third drive element are electrically connected to the third phase winding.

7. A controller for controlling a brushless direct current (BLDC) motor, wherein the BLDC motor includes a predetermined number of phase windings, said controller comprising:

a drive assembly in electrical communication with a power supply and the BLDC motor, wherein said drive assembly is capable of receiving a voltage output of the power supply and is capable of providing a pulse-width-modulated input voltage to the BLDC motor, wherein said drive assembly comprises a plurality of half-bridge assemblies that each include two switching elements, wherein at least two half-bridge assemblies are electrically connected to each phase winding of the BLDC motor, wherein each switching element is capable of operating at an operating frequency with a first duty ratio such that the at least two half-bridge assemblies are capable of providing the pulse-width-modulated input voltage to the respective phase winding of the BLDC motor at the operating frequency with a second duty ratio higher than the first duty ratio, and wherein the second duty ratio equals the product of the number of half-bridge assemblies electrically connected to the respective phase winding and the first duty ratio; and a processing element in electrical communication with said drive assembly and the BLDC motor, wherein said processing element is capable of controlling operation of the drive assembly.

8. A drive assembly for providing a pulse-width-modulated input voltage to a brushless direct current (BLDC) motor, wherein said drive assembly comprises a plurality of half-bridge assemblies that each include two switching elements, wherein at least two half-bridge assemblies are electrically connected to each phase winding of the BLDC motor, and wherein each switching element is capable of operating at an operating frequency with a first duty ratio such that the at least two half-bridge assemblies are capable of providing a pulse-width-modulated input voltage to the respective phase winding of the BLDC motor at the operating frequency with a duty ratio higher than the first duty ratio.

9. A drive assembly according to claim 8, wherein the switching elements comprise insulated gate bipolar transistors (IGBT's).

10. A drive assembly according to claim 8, wherein said drive assembly comprises a plurality of drive elements that each comprise the predefined number of half-bridge assemblies, wherein each half-bridge assembly of each drive element is in electrically connected to a respective phase winding of the BLDC motor.

11. A drive assembly according to claim 10, wherein the BLDC motor includes a first, a second and a third phase winding, wherein said drive assembly comprises a plurality of drive elements that each comprise a first half-bridge assembly, a second half-bridge assembly and a third half-bridge assembly, wherein the first half-bridge assemblies are electrically connected to the first phase winding, wherein the second half-bridge assemblies are electrically connected to the second phase winding, and wherein the third half-bridge assemblies are electrically connected to the third phase winding.

12. A drive assembly according to claim 8, wherein said drive assembly comprises a predefined number of drive elements that each comprise a plurality of half-bridge assemblies, wherein each half-bridge assembly of the drive elements is electrically connected to a respective phase winding of the BLDC motor.

13. A drive assembly according to claim 12, wherein the BLDC motor includes a first, a second and a third phase winding, wherein said drive assembly comprises a first, a second and a third drive element that each comprise a plurality of half-bridge assemblies, wherein the half-bridge assemblies of the first drive element are electrically connected to the first phase winding, wherein the half-bridge assemblies of the second drive element are electrically connected to the second phase winding, and wherein the half-bridge assemblies of the third drive element are electrically connected to the third phase winding.

14. A drive assembly for providing a pulse-width-modulated input voltage to a brushless direct current (BLDC) motor, wherein said drive assembly comprises a plurality of half-bridge assemblies that each include two switching elements, wherein at least two half-bridge assemblies are electrically connected to each phase winding of the BLDC motor, wherein each switching element is capable of operating at an operating frequency with a first duty ratio such that the at least two half-bridge assemblies are capable of providing a pulse-width-modulated input voltage to the respective phase winding of the BLDC motor at the operating frequency with a duty ratio higher than the first duty ratio, and the second duty ratio equals the product of the number of half-bridge assemblies electrically connected to the respective phase winding and the first duty ratio.

* * * * *